(12) United States Patent
Nordbruch

(10) Patent No.: US 11,488,481 B2
(45) Date of Patent: Nov. 1, 2022

(54) METHOD FOR ASSISTING A MOTOR VEHICLE

(71) Applicant: Robert Bosch GmbH, Stuttgart (DE)

(72) Inventor: Stefan Nordbruch, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 161 days.

(21) Appl. No.: 17/025,427

(22) Filed: Sep. 18, 2020

(65) Prior Publication Data
US 2021/0090440 A1 Mar. 25, 2021

(30) Foreign Application Priority Data
Sep. 23, 2019 (DE) .......................... 102019214445.4

(51) Int. Cl.
| G08G 1/16 | (2006.01) |
| G08G 1/0967 | (2006.01) |
| G05D 1/00 | (2006.01) |

(52) U.S. Cl.
CPC .......... *G08G 1/167* (2013.01); *G05D 1/0022* (2013.01); *G05D 1/0061* (2013.01); *G08G 1/096783* (2013.01); *G08G 1/164* (2013.01)

(58) Field of Classification Search
CPC .. G08G 1/167; G08G 1/096783; G08G 1/164; G05D 1/0022; G05D 1/0061
See application file for complete search history.

(56) References Cited

U.S. PATENT DOCUMENTS

| 10,496,090 B2 * | 12/2019 | Latotzki ............ B60W 60/0053 |
| 10,595,175 B2 * | 3/2020 | Ramalho de Oliveira ................... G08G 1/0112 |
| 11,003,184 B2 * | 5/2021 | Magalhães de Matos ................... H04L 67/10 |
| 11,137,760 B2 * | 10/2021 | Latotzki ............... G05D 1/0061 |
| 2014/0092237 A1 * | 4/2014 | Watanabe .............. G08G 1/166 348/118 |
| 2017/0332208 A1 * | 11/2017 | Cardoso de Moura ...................... H04W 24/08 |
| 2017/0341652 A1 * | 11/2017 | Sugawara .............. G08G 1/166 |
| 2018/0075308 A1 * | 3/2018 | Song ...................... G08G 1/167 |
| 2018/0191828 A1 * | 7/2018 | Pereira Cabral ........ H04L 43/50 |

(Continued)

FOREIGN PATENT DOCUMENTS

| CN | 206331287 U | * | 7/2017 | ............. G01B 11/00 |
| DE | 102006048627 B3 | | 6/2008 | |

(Continued)

*Primary Examiner* — Luis A Martinez Borrero
(74) *Attorney, Agent, or Firm* — Norton Rose Fulbright US LLP; Gerard Messina

(57) ABSTRACT

A method of assisting a motor vehicle driven in an at least semiautomated manner, for passing through a tunnel. The method includes: receiving surrounding-area signals that represent an area, which surrounds the motor vehicle, and of which at least a part includes a tunnel; receiving safety condition signals, which represent at least one safety condition that must be satisfied, so that the motor vehicle may be assisted from outside of the motor vehicle while passing through the tunnel; checking if the at least one safety condition is satisfied; generating data signals, which represent data suitable for assisted traversal of the tunnel by the motor vehicle, based on the surrounding-area signals, and based on a result of whether the at least one safety condition is satisfied; outputting the generated data signals. A device, a computer program, and a machine-readable storage medium are also described.

9 Claims, 2 Drawing Sheets

(56) References Cited

U.S. PATENT DOCUMENTS

| | | | |
|---|---|---|---|
| 2018/0220309 A1* | 8/2018 | Gomes | G05D 1/0022 |
| 2018/0255508 A1* | 9/2018 | Lopes | H04L 67/12 |
| 2018/0317067 A1* | 11/2018 | Ameixieira | H04W 76/10 |
| 2018/0338001 A1* | 11/2018 | Pereira Cabral | H04L 67/141 |
| 2018/0373268 A1* | 12/2018 | Antunes Marques Esteves | B60L 58/12 |
| 2018/0375939 A1* | 12/2018 | Magalhães de Matos | H04L 41/12 |
| 2018/0376305 A1* | 12/2018 | Ramalho de Oliveira | H04W 4/44 |
| 2018/0376306 A1* | 12/2018 | Ramalho de Oliveira | H04W 88/10 |
| 2018/0376357 A1* | 12/2018 | Tavares Coutinho | H04W 64/003 |
| 2019/0026796 A1* | 1/2019 | Dinis da Silva de Carvalho | G06Q 50/30 |
| 2019/0045336 A1* | 2/2019 | Chang | H04W 4/40 |
| 2019/0066409 A1* | 2/2019 | Moreira da Mota | G07C 5/0808 |
| 2019/0068434 A1* | 2/2019 | Moreira da Mota | H04L 41/40 |
| 2019/0149417 A1* | 5/2019 | Augusto Lopes | H04L 41/0886 370/254 |
| 2019/0171208 A1* | 6/2019 | Magalhães de Matos | G05D 1/0027 |
| 2019/0173753 A1* | 6/2019 | Correia e Costa | H04L 41/0823 |
| 2019/0174276 A1* | 6/2019 | Mineiro Ramos de Azevedo | H04W 4/38 |
| 2019/0205115 A1* | 7/2019 | Gomes | H04W 4/50 |
| 2019/0222652 A1* | 7/2019 | Graefe | H04L 67/12 |
| 2019/0230525 A1* | 7/2019 | Carreira | H04W 16/32 |
| 2019/0347695 A1* | 11/2019 | Jorge | G06Q 30/0261 |
| 2020/0004242 A1* | 1/2020 | Kim | G05D 1/0088 |
| 2020/0005633 A1* | 1/2020 | Jin | G06F 21/6254 |
| 2021/0086766 A1* | 3/2021 | Nordbruch | B60W 30/09 |
| 2021/0107477 A1* | 4/2021 | Kim | B60W 40/02 |
| 2021/0278849 A1* | 9/2021 | Zhu | B60W 30/09 |
| 2021/0349460 A1* | 11/2021 | Huang | G06F 3/011 |

FOREIGN PATENT DOCUMENTS

| | | | | |
|---|---|---|---|---|
| DE | 102009036177 A1 | 2/2010 | | |
| DE | 102013108034 B3 | 1/2015 | | |
| DE | 112014001058 T5 | 12/2015 | | |
| WO | 2014148975 A1 | 9/2014 | | |
| WO | 2019028464 A1 | 2/2019 | | |
| WO | WO-2019116784 A1 * | 6/2019 | | G01B 11/00 |
| WO | WO-2020205597 A1 * | 10/2020 | | B60W 40/09 |
| WO | WO-2021177964 A1 * | 9/2021 | | B60W 40/09 |

* cited by examiner

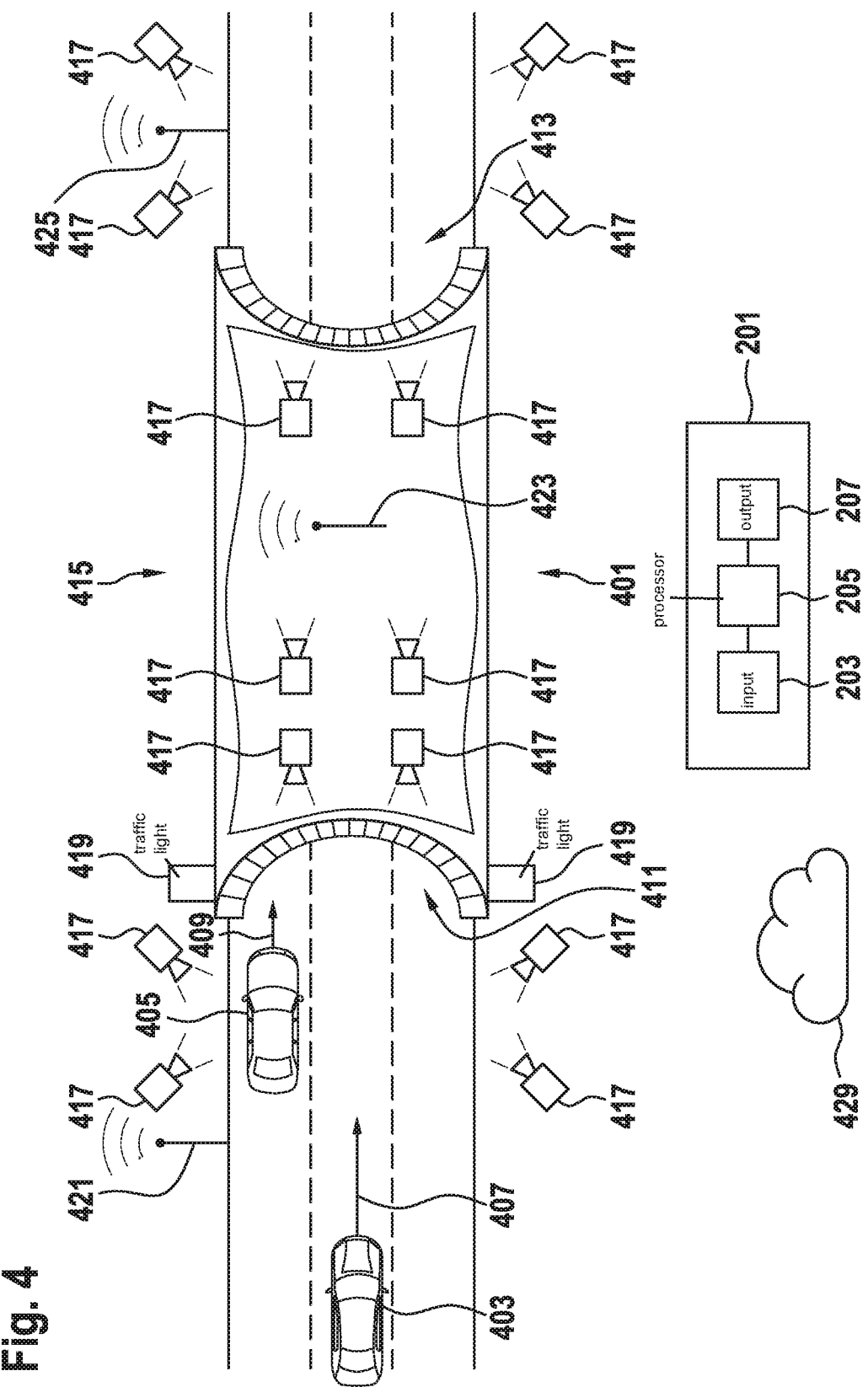

METHOD FOR ASSISTING A MOTOR VEHICLE

BACKGROUND INFORMATION

German Patent Application No. DE 11 2014 001 058 T5 of the international application and PCT Application No. WO 2014/148975 describe a method and a system for controlling autonomous vehicles.

PCT Application No. WO 2019/028464 A1 describes a method for automatically controlling activation and deactivation of an autonomous mode of vehicles.

CROSS REFERENCE

The present application claims the benefit under 35 U.S.C. § 119 of German Patent Application No. DE 102019214445.4 filed on Sep. 23, 2019, which is expressly incorporated herein by reference in its entirety.

FIELD

The present invention relates to a method for assisting a motor vehicle driven in an at least semiautomated manner for passing through a tunnel. In addition, the present invention relates to a device, a computer program and a machine-readable storage medium.

SUMMARY

An object of the present invention is to provide for efficiently assisting a motor vehicle driven in an at least semiautomated manner for passing through a tunnel.

This object is achieved with the aid of the example embodiments of the present invention. Advantageous refinements of the present invention are described herein.

According to a first aspect of the present invention, a method for assisting a motor vehicle driven in an at least semiautomated manner for passing through a tunnel is provided. In accordance with an example embodiment of the present invention, the method includes the following steps:

receiving surrounding-area signals that represent an area, which surrounds the motor vehicle, and of which at least a part includes a tunnel;

receiving safety condition signals, which represent at least one safety condition that must be satisfied, so that the motor vehicle may be assisted from outside of the motor vehicle while passing through the tunnel;

checking if the at least one safety condition is satisfied;

generating data signals, which represent data suitable for assisted traversal of the tunnel by the motor vehicle, based on the surrounding-area signals, and based on a result of whether the at least one safety condition is satisfied;

outputting the generated data signals.

According to a second aspect of the present invention, a device is provided, which is configured to execute all of the steps of the method according to the first aspect.

According to a third aspect of the present invention, a computer program is provided, which includes commands that, in response to the execution of the computer program by a computer, for example, by the device according to the second aspect, cause it to implement a method according to the first aspect.

According to a fourth aspect of the present invention, a machine-readable storage medium is provided, in which the computer program according to the third aspect is stored.

The above-mentioned object may be achieved by assisting the motor vehicle during traversal of a tunnel in accordance with example embodiments of the present invention. For this, in particular, data, which are suitable for assisting, are generated and outputted to the motor vehicle and/or transmitted to the motor vehicle. This produces, for example, the technical advantage that the motor vehicle may be assisted in an efficient manner while passing through the tunnel.

Since these data are generated as a function of a result of a check as to whether the at least one safety condition is satisfied, it may be ensured, in particular, in an advantageous manner, that the data may be generated in a safe setting. Thus, for example, it may be efficiently ensured that the data may not be, or have not been, manipulated. This may ensure, for example, an advantageous manner, in which the data may be transmitted, safe from manipulation, to the motor vehicle.

Therefore, this means, in particular, that the motor vehicle may rely on these data, when, for example, based on these data, it passes through the tunnel, driven in an at least semiautomated manner.

This produces, for example, the technical advantage that an accident risk for the motor vehicle and/or for road users in the surroundings of the motor vehicle may be reduced.

Thus, this produces, in particular, the technical advantage that an efficient concept is provided for efficient, at least assisted traversal of a tunnel by a motor vehicle driven in an at least semiautomated manner.

In the spirit of the description, assisting is assisting outside of the vehicle, for example, using a tunnel infrastructure. Assisting includes, in particular, the generating of the data signals and the outputting of the data signals.

One specific embodiment provides a step of determining that a motor vehicle driven in an at least semiautomated manner is expected to pass through a tunnel.

For example, the surrounding-area signals are processed, in order to detect a motor vehicle, which is being driven in an at least semiautomated manner and intends to travel through the tunnel.

In response to the detection of a motor vehicle, which is being driven in at least semiautomated manner and intends to travel through the tunnel, it is determined, for example, that a motor vehicle driven in an at least semiautomated manner wishes to travel through or traverse the tunnel.

According to one specific embodiment of the present invention, the data include a driving requirement, which the motor vehicle is supposed to follow.

A technical advantage of this may be, for example, that the assisting may be carried out efficiently.

According to one specific embodiment of the present invention, the driving requirement is directed to a driver of the motor vehicle.

According to one specific embodiment of the present invention, the driving requirement is directed to the motor vehicle itself. Thus, this means, in particular, that the driving requirement is intended to be implemented or followed by the motor vehicle independently, that is, in particular, autonomously.

According to one specific embodiment of the present invention, the driving requirement includes remote control commands for controlling a lateral and/or longitudinal guidance of the motor vehicle remotely.

This may produce, for example, the technical advantage that the driving requirement may be implemented efficiently. Therefore, this means, in particular, that according to this specific embodiment, the motor vehicle is controlled remotely on the basis of the driving requirement. The remote control means that, in particular, the lateral and/or longitudinal guidance of the motor vehicle is controlled remotely. Therefore, the remote control is carried out, in particular, on the basis of the remote control commands.

The assisting of the motor vehicle from outside of the motor vehicle during the traversal of the tunnel includes, in particular, the case, in which only the lateral guidance or only the longitudinal guidance of the motor vehicle is controlled remotely, or both the lateral guidance and the longitudinal guidance of the motor vehicle are controlled remotely.

In the case, in which the remote control signals are intended for controlling the lateral or the longitudinal guidance of the motor vehicle, one specific embodiment provides that in each instance, the other guidance, that is, the longitudinal guidance or the lateral guidance, be either controlled manually by the driver or controlled in an at least semiautomated manner, in order to drive the motor vehicle in an at least semiautomated manner for passing the motor vehicle through with assistance.

The wording "at least semiautomated driving" includes one or more of the following cases: semiautomated driving, highly automated driving, fully automated driving.

Semiautomated driving means that in a specific situation (for example: driving on an expressway, driving within a parking lot, passing a collision object, driving within a traffic lane, which is defined by lane markings) and/or for a certain period of time, longitudinal and lateral guidance of the motor vehicle are controlled remotely in an automatic manner. A driver of the motor vehicle does not have to manually control the longitudinal and lateral guidance of the motor vehicle himself/herself. However, the driver must monitor the automatic, remote control of the longitudinal and lateral guidance continuously, in order to be able to manually intervene, if necessary. The driver must be ready to completely take over the driving of the motor vehicle at any time.

Highly automated driving means that for a certain period of time, in a specific situation (for example: driving on an expressway, driving within a parking lot, passing a collision object, driving within a traffic lane, which is defined by lane markings), longitudinal and lateral guidance of the motor vehicle are controlled remotely in an automatic manner. A driver of the motor vehicle does not have to manually control the longitudinal and lateral guidance of the motor vehicle himself/herself. The driver does not have to monitor the automatic, remote control of the longitudinal and lateral guidance continuously, in order to be able to intervene manually, as required. If necessary, a take-over request to the driver for assuming the control of the longitudinal and lateral guidance is outputted automatically, in particular, outputted with adequate time to spare. Thus, the driver must be potentially able to take over the control of the longitudinal and lateral guidance. Limits of the automatic, remote control of the lateral and longitudinal guidance are detected automatically. In the case of highly automated driving, it is not possible to bring about a minimum-risk state automatically in every initial situation.

Fully automated driving means that in a specific situation (for example: driving on an expressway, driving within a parking lot, passing a collision object, driving within a traffic lane, which is defined by lane markings), longitudinal and lateral guidance of the motor vehicle is controlled remotely in an automatic manner. A driver of the motor vehicle does not have to manually control the longitudinal and lateral guidance of the motor vehicle himself/herself. The driver does not have to monitor the automatic, remote control of the longitudinal and lateral guidance, in order to be able to intervene manually, when necessary. Prior to an end of the automatic, remote control of the lateral and longitudinal guidance, a request for the driver to take over the driving task (controlling the lateral and longitudinal guidance of the motor vehicle) is made automatically, in particular, with adequate time to spare. If the driver does not assume the driving task, then a return is made automatically to a minimum-risk state. Limits of the automatic control of the lateral and longitudinal guidance are detected automatically. In all situations, it is possible to return automatically to a minimum-risk system state.

According to one specific embodiment of the present invention, it is provided that the at least one safety condition be, in each instance, an element selected from the following group of safety conditions: presence of a predetermined safety integrity level (SIL) or automotive safety integrity level (ASIL) of at least the motor vehicle and an infrastructure, in particular, including a communication path and/or communications components (for example, a communications interface), for controlling a motor vehicle remotely, in particular, with regard to the overall systems in the motor vehicle and infrastructure, as well as, in particular, parts, e.g., components, algorithms, interfaces, etc.; presence of a maximum latency time of a communication between the motor vehicle and a remote control device for controlling the motor vehicle remotely on the basis of the remote control signals; presence of a predetermined computer protection level of a device for executing the steps of the method according to the first aspect; presence of predetermined components and/or algorithms and/or communication options, which are used for executing the steps of the method according to the first aspect; presence of redundancy and/or diversity in predetermined components and/or algorithms and/or communication options, which are used for executing the steps of the method according to the first aspect; presence of predetermined availability information, which indicates an availability of predetermined components and/or algorithms and/or communication options; presence of predetermined quality criteria of the predetermined components and/or algorithms and/or communication options; presence of a plan, which includes measures for reducing faults, and/or measures in response to failures of predetermined components and/or algorithms and/or communication options, and/or measures for incorrect analyses and/or measures in response to incorrect interpretations; presence of one or more fallback scenarios; presence of a predetermined function; presence of a predetermined traffic situation; presence of predetermined weather, maximum possible time for a specific performance or execution of one step or a plurality of steps of the method according to the first aspect; presence of a test result, that elements or functions, which are used for executing the method according to the first aspect, are presently functioning correctly.

A communication path is, for example, a communication path between the device according to the second aspect, and the motor vehicle. A communication path includes, for example, one or more communication channels.

In one specific embodiment of the present invention, a component, which is used for executing the method according to the first aspect, is an element selected from the following group of components: surround sensor, motor vehicle, infrastructure, remote control device, device according to the second aspect, motor vehicle system, in particular, drive system, clutch system, brake system, driver assistance system, communications interface of the motor vehicle or of the infrastructure, processor, input, output of the device according to the second aspect.

In one specific embodiment of the present invention, a function, which is used for executing the method according to the first aspect, is an element selected from the following group of functions: remote control function, communication function between the motor vehicle and the infrastructure or the remote control device, evaluation function of surround sensor data of a surround sensor, planning function, in particular, travel planning function, traffic analysis function.

The following determines, in particular, a computer protection level: activated firewall and/or valid encryption certificate for encryption of a communication between the motor vehicle and the infrastructure or the remote control device, and/or activated virus program including current virus signatures, and/or presence of a protection, in particular, mechanical protection, in particular, anti-intrusion protection, of the computer, in particular, of the device according to the second aspect, or of the remote control device, and/or presence of an option for checking that signals, in particular, remote control signals or surrounding-area signals, have been transmitted correctly, that is, error-free.

An algorithm includes, for example, the computer program according to the third aspect.

Since, in particular, it is checked that redundancy and/or diversity is present in predetermined components and/or algorithms and/or communication options, for example, the technical advantage is provided, that in the case of failure of the corresponding component, for example, of a computer, or of the corresponding algorithm or the corresponding communication option, nevertheless, safe functioning may be implemented.

In order to ensure that results are correct, according to one specific embodiment of the present invention, these may be computed several times, for example, and the corresponding results may be compared to each other. For example, it is only determined that the results are correct, if the results agree. If an odd number occurs several times, it may then be determined, for example, that the result corresponding to the highest number of equal results is correct.

For example, the data signals are only generated, when it is able to be determined that the result is correct.

In one specific embodiment of the present invention, the data signals are only generated, if the at least one safety condition is satisfied.

According to one specific embodiment of the present invention, the surrounding-area signals are processed, in order to detect a collision object, in particular, a further vehicle, situated within a predetermined distance after a tunnel entrance or after a tunnel exit, based on a direction of travel of the motor vehicle.

This may produce, for example, the technical advantage that a corresponding collision object may be detected efficiently.

In one specific embodiment of the present invention, as a function of the detection of a corresponding collision object, in particular, a further motor vehicle, the data include the information that a corresponding collision object, in particular, a further motor vehicle, has or has not been detected.

This may produce, for example, the technical advantage that it may efficiently be communicated to the motor vehicle, whether or not a collision object, in particular, a further motor vehicle, is situated after a tunnel entrance and/or a tunnel exit. Thus, this means, in particular, that whether the tunnel entrance and/or tunnel exit are free, may be communicated to the motor vehicle. Therefore, the information may include, in particular, clearance for traveling into the tunnel or traveling out of the tunnel, when no corresponding collision object has been detected.

Generally, surround sensors of motor vehicles may have problems detecting collision objects, in particular, other motor vehicles, immediately after a tunnel entrance and/or tunnel exit. One reason is, in particular, that, for example, the lighting conditions change abruptly: from bright to dark, and vice versa. Thus, in such a situation, the motor vehicle may be assisted efficiently by a relevant communication as to whether or not the tunnel entrance and/or tunnel exit are free.

In one specific embodiment, the driving requirement includes a stop, in particular, an emergency stop, especially, emergency braking, in response to detection of a corresponding collision object.

This produces, for example, the technical advantage that a collision risk may be efficiently reduced, and/or that if a collision still occurs, an accident severity may be efficiently reduced.

In one specific embodiment of the present invention, after the data signals are outputted, in which case the data include a driving requirement that the motor vehicle is supposed to follow and the driving requirement includes remote control commands for controlling a lateral and/or longitudinal guidance of the motor vehicle remotely, remote control of the motor vehicle on the basis of the remote control commands is tested, in order to detect a fault; and in response to detection of a fault, the remote control is broken off, or emergency remote control signals for controlling the lateral and/or longitudinal guidance of the motor vehicle remotely in an emergency are generated and outputted.

The emergency remote control signals are, for example, such, that in the case of the remote control of the lateral and/or longitudinal guidance of the motor vehicle on the basis of the emergency remote control signals, the motor vehicle is carried over into a safe state, in particular, stopped.

In one specific embodiment of the present invention, after the data signals are outputted, in which case the data include a driving requirement that the motor vehicle is supposed to follow and the driving requirement includes remote control commands for controlling a lateral and/or longitudinal guidance of the motor vehicle remotely, remote control of the motor vehicle on the basis of the remote control commands is tested, in order to detect a fault; and in response to detection of a fault, the remote control is interrupted, or internal motor vehicle emergency control signals for controlling the lateral and/or longitudinal guidance of the motor vehicle in an emergency are generated and outputted.

The internal motor vehicle emergency control signals are, for example, such, that in the case of the control of the lateral and/or longitudinal guidance of the motor vehicle on the basis of the internal motor vehicle emergency control signals, the motor vehicle is carried over into a safe state, in particular, stopped.

Thus, internal motor vehicle emergency control signals are emergency control signals, which the motor vehicle generates itself and/or are generated in the motor vehicle.

For example, this may produce the technical advantage that in the event of a breakdown of communication, which corresponds, for example, to an emergency, between the motor vehicle and the device according to the second aspect, that is, a remote control device for controlling motor vehicles remotely, the motor vehicle may also carry itself over into a safe state.

Explanations, which are made in connection with the remote control commands and/or the internal motor vehicle emergency control signals, apply analogously to the emergency remote control signals, and vice versa.

According to one specific embodiment of the present invention, one or more method steps up to the steps of generating and outputting the data signals are executed in the motor vehicle, and/or one or more method steps are executed outside of the motor vehicle, in particular, in an infrastructure, preferably, in a cloud infrastructure and/or in a tunnel infrastructure.

This may produce, for example, the technical advantage that the corresponding method steps may be carried out in an efficiently redundant manner. In particular, this may further increase safety in an advantageous manner.

According to one specific embodiment of the present invention, one or more method steps are documented, in particular, documented in a blockchain.

This may produce, for example, the technical advantage that on the basis of the documentation, this may also be analyzed subsequently after the performance or execution of the method. In particular, the documentation in a blockchain has the technical advantage that the documentation is safe from manipulation and falsification.

A blockchain (also block chain) is, in particular, a continuously expandable list of data records, called blocks, which are linked together with the aid of one or more cryptographic methods. In this context, each block contains, in particular, a cryptographically secure hash (standard value of deviation) of the preceding block, in particular, a time stamp and, in particular, transactional data.

One illustrative application may include, for example, one or more of the following specific embodiments and/or features and/or examples:

In one specific embodiment of the present invention, it is determined that a motor vehicle is driving towards the tunnel.

For example, information signals are received, which represent an information item, that a motor vehicle is driving towards the tunnel. For example, the information signals are transmitted by the motor vehicle. Based on the information signals, it is determined, for example, that a motor vehicle is driving towards the tunnel. For example, the motor vehicle emits a signal and is detected in this manner. Thus, this means, in particular, that the motor vehicle may emit a signal, for example, a positional signal. In response to such a signal, for example, it is determined that a motor vehicle is driving towards the tunnel.

For example, the surrounding-area signals are processed, in particular, with the aid of a tunnel infrastructure, in order to detect a motor vehicle driving towards the tunnel. The motor vehicle may be detected, for example, using its license plate. The processing of the surrounding-area signals includes, in particular, license plate detection.

For example, the motor vehicle is connected to the tunnel infrastructure so as to be able to communicate, or it is connected (automatically) to the tunnel infrastructure in front of the tunnel so as to be able to communicate (in particular, automatically).

The tunnel infrastructure includes, for example, the device according to the second aspect. The tunnel infrastructure includes, for example, one or more spatially distributed surround sensors for monitoring the tunnel and/or the tunnel entrance and/or the tunnel exit and/or a surrounding area of the tunnel.

For example, a tunnel situation and/or the motor vehicle and/or a position of the motor vehicle are analyzed, in particular, with the aid of the tunnel infrastructure.

For example, the motor vehicle is located.

Motor vehicle data are sent by the motor vehicle, for example, automatically/for example, by request. Motor vehicle data include, for example, positional data, in particular, GPS data, and/or motor vehicle speed data.

The tunnel infrastructure detects the motor vehicle, for example, with the aid of visual infrastructure sensors, that is, surround sensors, for example, video sensors.

For example, the motor vehicle transmits its travel route to the device according to the second aspect of the present invention.

For example, travel route signals are received, which represent a travel route of the motor vehicle. The travel route includes, for example, a motor vehicle speed along the travel route.

For example, a traffic event is analyzed, in particular, with the aid of the tunnel infrastructure, especially, with the aid of the device according to the second aspect of the present invention.

The analyzing of the traffic event includes, for example, processing of motor vehicle data transmitted by further motor vehicles, and/or processing, for example, visual analysis, of the surround sensor data of the surround sensors of the tunnel infrastructure.

In one specific embodiment of the present invention, data, which are suitable for assisted traversal of the tunnel by the motor vehicle, are ascertained.

In one specific embodiment, the data include a driving requirement. In particular, the driving requirement includes remote control commands for controlling the lateral and/or longitudinal guidance of the motor vehicle remotely.

One driving requirement includes a tunnel route through the tunnel. In particular, the driving requirement includes a speed characteristic along the tunnel route.

The data are transmitted, for example, to the motor vehicle via a wireless communications network.

The example method according to the first aspect is carried out, for example, during a trip of the motor vehicle, that is, without stopping the motor vehicle, e.g., for transferring the motor vehicle guidance from the motor vehicle and/or from the driver to the tunnel infrastructure.

According to one specific embodiment of the present invention, if, for example, a hazard is determined during the implementation of the method according to the first aspect, then at least one of the following actions and/or steps is initiated and/or performed:

The motor vehicle is stopped for safety reasons, and, in particular, a solution is subsequently sought.

For example, other road users, in particular, motor vehicles, in the surroundings of the motor vehicle are informed about the hazard. The informing is carried out, for example, over V2I communication systems. The informing is carried out, for example, via information systems outside of the vehicle, such as signs and/or audio systems.

For example, a traffic guidance system including, for example, traffic systems, in particular, traffic lights and/or indicator systems, is used, that is, controlled, in order to assist the motor vehicle in its transit through the tunnel.

The method steps are preferably documented in a comprehensible manner safe from falsification, in particular, in a block chain.

In one specific embodiment of the present invention, the traversal of the tunnel by the motor vehicle is assisted by a person included in the tunnel infrastructure.

According to one specific embodiment of the present invention, it is provided that the method according to the first aspect be a computer-implemented method.

According to one specific embodiment of the present invention, the method according to the first aspect is executed or performed with the aid of the device according to the second aspect.

Device features follow analogously from corresponding method features, and vice versa. Thus, this means that, in particular, technical functions of the device according to the second aspect follow analogously from corresponding instances of technical functionality of the method according to the first aspect, and vice versa.

The wording "at least one" stands, in particular, for "one or more."

The terms traffic lane and lane may be used synonymously.

Exemplary embodiments of the present invention are represented in the figures and explained in greater detail below.

BRIEF DESCRIPTION OF THE DRAWINGS

FIG. 4 shows a tunnel in accordance with an example embodiment of the present invention.

DETAILED DESCRIPTION OF EXAMPLE EMBODIMENTS

Figure 1:
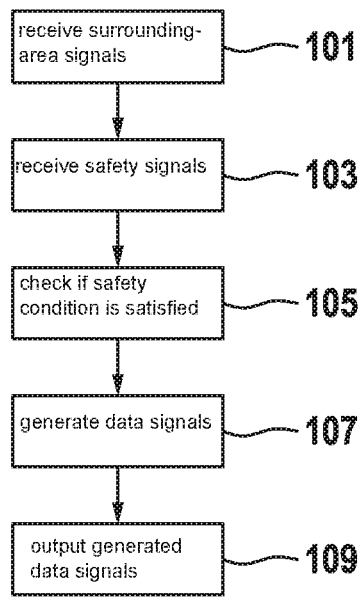
FIG. 1 shows a flow chart of an example method according to the first aspect of the present invention.

FIG. 1 shows a flow chart of an example method in accordance with the present invention for assisting a motor vehicle driven in an at least semiautomated manner, for passing through and/or while passing through a tunnel. The example method includes the following steps:

receiving 101 surrounding-area signals that represent an area, which surrounds the motor vehicle, and of which at least a part includes a tunnel;

receiving 103 safety condition signals, which represent at least one safety condition that must be satisfied, so that the motor vehicle may be assisted from outside of the motor vehicle while passing through the tunnel;

checking 105 if the at least one safety condition is satisfied; generating 107 data signals, which represent data suitable for assisted traversal of the tunnel by the motor vehicle, based on the surrounding-area signals, and based on a result of whether the at least one safety condition is satisfied;

outputting 109 the generated data signals.

According to one specific embodiment of the present invention, the data include a driving requirement, which the motor vehicle is supposed to follow.

According to one specific embodiment of the present invention, the driving requirement includes remote control commands for controlling a lateral and/or longitudinal guidance of the motor vehicle remotely.

According to one specific embodiment of the present invention, the method according to the first aspect includes controlling a lateral and/or longitudinal guidance of the motor vehicle remotely on the basis of the remote control commands.

According to one specific embodiment of the present invention, the result as to whether the at least one safety condition is satisfied, indicates that the at least one safety condition is or is not satisfied.

In one specific embodiment of the present invention, the data signals are only generated, if the result as to whether the at least one safety condition is satisfied, indicates that the at least one safety condition is satisfied.

If the at least one safety condition is not satisfied, then, for example, the generation of data signals is refrained from.

For example, the driving requirement only includes remote control commands for controlling a lateral and/or longitudinal guidance of the motor vehicle remotely, if the result as to whether the at least one safety condition is satisfied, indicates that the at least one safety condition is satisfied. Alternatively, the driving requirement does not include remote control commands for controlling a lateral and/or longitudinal guidance of the motor vehicle remotely.

Therefore, this means, in particular, that the remote control of a lateral and/or longitudinal guidance of the motor vehicle is refrained from, if the at least one safety condition is not satisfied.

In one specific embodiment of the present invention (not shown), a tunnel infrastructure transmits the data signals and/or, in particular, the surrounding-area signals and/or, in particular, the safety condition signals to the motor vehicle. For example, the motor vehicle analyzes the data, that is, the surrounding-area signals and/or safety condition signals, itself and ascertains, for example, itself, the driving instructions necessary and/or needed for passing through the tunnel and continues driving (in particular, temporarily), for example, guided in an at least semiautomated manner, on the basis of the necessary driving instructions.

Figure 2:
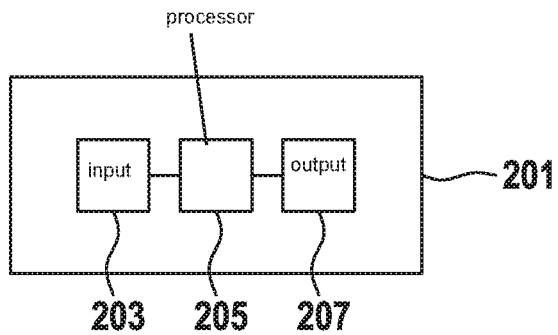
FIG. 2 shows an example device according to the second aspect of the present invention.

FIG. 2 shows a device 201 in accordance with an example embodiment of the present invention.

Device 201 is configured to execute all of the steps of the method according to the first aspect of the present invention.

Device 201 includes an input 203, which is configured to receive the surrounding-area signals and the safety condition signals.

Device 201 further includes a processor 205, which is configured to execute the checking step and the generating step.

For example, processor 205 is configured to determine, based on the surrounding-area signals, that a motor vehicle intends to pass through a tunnel.

Device 201 further includes an output 207, which is configured to output the data signals generated.

According to one specific embodiment of the present invention, for example, outputting the generated data signals includes transmitting the data signals over a communications network, in particular, over a wireless communications network, to the motor vehicle.

Processor 205 is configured, for example, to process the surrounding-area signals, in order to detect a motor vehicle situated in a surrounding area of the tunnel. For example, in response to the detection of a motor vehicle situated in the surrounding area of the tunnel, processor 205 is configured to determine that a motor vehicle intends to pass through the tunnel.

In general, signals, which are received, are received with the aid of input 203. Thus, input 203 is configured, in particular, to receive the corresponding signals.

In general, signals, which are outputted, are outputted with the aid of output 207. Thus, output 207 is configured, in particular, to output the corresponding signals.

According to one specific embodiment of the present invention, a plurality of processors are provided in place of the one processor 205.

According to one specific embodiment of the present invention, processor 205 is configured to execute the generating and/or checking and/or determining steps described above and/or in the following.

According to one specific embodiment of the present invention, device 201 is part of an infrastructure, in particular, cloud infrastructure, for example, part of a tunnel infrastructure.

Figure 3:
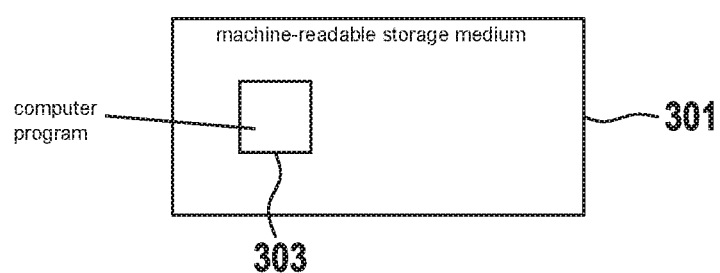
FIG. 3 shows a machine-readable storage medium in accordance with an example embodiment of the present invention.

FIG. 3 shows a machine-readable storage medium 301 in accordance with an example embodiment of the present invention.

A computer program 303 is stored in machine-readable storage medium 301; the computer program including commands, which, in response to execution of the computer program by a computer, cause it to implement a method according to the first aspect of the present invention.

According to one specific embodiment of the present invention, device 201 includes a remote control device, which is configured to control a lateral and/or longitudinal guidance of motor vehicles remotely on the basis of the remote control commands. Thus, this means, in particular, that the remote control device is configured, in particular, to control the motor vehicle remotely on the basis of the remote control commands, that is, to control the lateral and/or longitudinal guidance of the motor vehicle on the basis of the remote control commands.

FIG. 4 shows a tunnel 401 in accordance with an example embodiment of the present invention.

A first motor vehicle 403 and a second motor vehicle 405 wish to travel through tunnel 401, driven in an at least semiautomated manner.

In a specific embodiment not shown, for example, one of these motor vehicles 403, 405 may travel through tunnel 401, driven manually by a driver.

A direction of travel of first motor vehicle 403 is indicated symbolically by an arrow having the reference numeral 407.

A direction of travel of second motor vehicle 405 is indicated symbolically by an arrow having the reference numeral 409.

Based on directions of travel 407, 409, tunnel 401 includes a tunnel entrance 411 and a tunnel exit 413.

Tunnel 401 includes a tunnel infrastructure 415.

Tunnel infrastructure 415 includes a plurality of video cameras 417, each having one video sensor (not shown), which monitor an interior of tunnel 401, tunnel exit 413 and tunnel entrance 411.

In one specific embodiment of the present invention (not shown), for example, further surround sensors are provided in place of, or in addition to, the video sensors of video cameras 417.

In the spirit of the description, a surround sensor is generally one of the following surround sensors: radar sensor, lidar sensor, ultrasonic sensor, magnetic field sensor, infrared sensor, and video sensor, in particular, video sensor of a video camera.

Tunnel infrastructure 415 includes two traffic lights 419, which control traffic at tunnel entrance 411.

Tunnel infrastructure 415 further includes device 201 according to FIG. 2.

Tunnel infrastructure 415 further includes a first wireless communications interface 421, which is situated in front of tunnel entrance 411 with respect to directions of travel 407, 409.

Tunnel infrastructure 415 further includes second wireless communications interface 423, which is situated inside of tunnel 401, that is, in the interior of tunnel 401.

Tunnel infrastructure 415 includes a third wireless communications interface 421, which is situated after tunnel exit 413 with respect to directions of travel 407, 409.

Tunnel infrastructure 415 further includes a cloud infrastructure 429. In a specific embodiment not shown, it is provided that device 201 be part of cloud infrastructure 429.

Method steps of the example method according to the first aspect of the present invention may be executed, for example, in cloud infrastructure 429.

The video signals of video cameras 417 are provided, for example, to device 201.

These video signals are, for example, an example of surrounding-area signals.

That is to say, in the spirit of the description, these video signals may be encompassed by surrounding-area signals.

For example, for motor vehicles 403, 405, remote control commands for controlling a specific lateral and/or longitudinal guidance of these motor vehicles may be generated on the basis of these video signals.

For example, with the aid of wireless communications interface 421, 423, 425, these remote control commands are transmitted over a wireless communications network to motor vehicles 403, 405.

For example, in one specific embodiment of the present invention, the data, which are ascertained with the aid of processor 205, include signal pattern data that represent a signal pattern of traffic lights 419.

Thus, this means, in particular, that the signal pattern of traffic lights 419 may be transmitted over the wireless communications network to the two motor vehicles 403, 405.

This may produce, for example, the technical advantage that these motor vehicles 403, 405 may efficiently obtain knowledge about the signal pattern of traffic lights 419.

For example, in response to detection of a collision object inside of tunnel 401 on the basis of the processing of the video signals, traffic lights 419 are controlled in such a manner, that they output an optically red signal, in order to signal optically to the two motor vehicles 403, 405, that they must stop.

This may advantageously allow, for example, a collision with the collision object to be prevented in an efficient manner.

One condition for generating the data signals in conformance with the method according to the first aspect is, in particular, that the at least one safety condition is satisfied.

For example, for controlling motor vehicles 403, 405 remotely, a latency time for transmitting the remote control commands over the wireless communications network with the aid of wireless communications interfaces 421, 423, 425 must be less than or less than or equal to a predetermined threshold latency time value.

For example, a motor vehicle, which may be controlled remotely on the basis of remote control commands, must have a predetermined safety integrity level.

According to one specific embodiment of the present invention, a condition for controlling the lateral and/or longitudinal guidance of motor vehicles remotely, that is, in particular, for controlling the lateral and/or longitudinal guidance of motor vehicle 403, 405 remotely, is that the remote control is safe. In the spirit of the description, "safe" means, in particular, "safe" and "secure." Actually, these two English terms are normally translated into German as "sicher". Nevertheless, these have a partially different meaning in English.

The term "safe" is directed, in particular, to the topic of accident and accident prevention. Remote control, which is "safe," causes, in particular, a probability of an accident or a collision to be less than or less than or equal to a predetermined threshold probability value.

The term "secure" is directed, in particular, to the topic of computer protection and/or hacker protection, that is, in particular, how securely is an (a) (computer) infrastructure and/or a communications infrastructure, in particular, a communication path between a motor vehicle and a remote control device for controlling a motor vehicle remotely, protected from unauthorized access and/or from data manipulation by a third party (hacker).

Thus, remote control, which is "secure," has, in particular, appropriate and sufficient computer protection and/or hacker protection as a basis.

For example, according to one specific embodiment of the present invention, it is tested if the entity made up of a motor vehicle and infrastructure involved in the method according to the first aspect, including communication between the infrastructure and the motor vehicle, is currently secure for the plan, "intervention in the motor vehicle for critical actions, specific application: tunnel" described here. Therefore, this means, in particular, that the motor vehicle and/or a local and/or a global infrastructure and/or communication are appropriately tested. The data signals, in particular, the remote control signals, are generated, in particular, on the basis of a result of the testing.

Thus, this means, in particular, that the components, which are used during the execution of the method according to the first aspect, are tested for safety, that is, as to whether these satisfy specific safety conditions, before the intervention in the vehicle operation is carried out, that is, before the motor vehicle is controlled remotely.

Important or dependent criteria include, for example, one or more of the safety conditions described above.

According to one specific embodiment of the present invention, first of all, the overall system (motor vehicle, infrastructure, for example, tunnel infrastructure, communication path, cloud, . . . ) is tested with regard to the safety condition.

According to one specific embodiment of the present invention, the individual parts are also tested with regard to satisfying the safety condition. This, in particular, prior to the remote control of the motor vehicle.

In this context, in one specific embodiment of the present invention, the testing step(s) are executed inside the motor vehicle and/or outside the motor vehicle, in particular, in an infrastructure, for example, tunnel infrastructure.

According to one specific embodiment of the present invention, the checking step(s) are tested subsequently, that is, at a later time, for example, at regular intervals. For example, the testing step(s) are tested subsequently at a predetermined frequency, for example, every 100 ms.

For example, according to one specific embodiment of the present invention, this testing, that is, the test as to whether the at least one safety condition is satisfied, takes place prior to and/or after and/or during one or more predetermined method steps.

According to one specific embodiment of the present invention, the testing is carried out or executed in response to problems.

What is claimed is:

1. A method of assisting a motor vehicle driven in an at least semiautomated manner, for passing through a tunnel, the method comprising the following steps:
receiving surrounding-area signals that represent an area, which surrounds the motor vehicle and of which at least a part includes the tunnel;
receiving safety condition signals, which represent at least one safety condition that must be satisfied, so that the motor vehicle may be assisted from outside of the motor vehicle while passing through the tunnel;
checking whether the at least one safety condition is satisfied;
generating data signals, which represent data suitable for assisted traversal of the tunnel by the motor vehicle, based on the surrounding-area signals, and based on a result of whether the at least one safety condition is satisfied; and
outputting the generated data,
wherein the at least one safety condition is, in each instance, an element selected from the following groups of safety conditions:
presence of a predetermined safety integrity level or automotive safety integrity level of at least the motor vehicle and an infrastructure including a communication path and/or communications components, for controlling a motor vehicle remotely;
presence of a maximum latency time of a communication between the motor vehicle and a remote control device for controlling the motor vehicle remotely based on the remote control signals;
presence of a predetermined computer protection level of a device for executing the steps of the method;
presence of predetermined components and/or algorithms and/or communication options, which are used for executing the steps of the method;
presence of redundancy and/or diversity in predetermined components and/or algorithms and/or communication options, which are used for executing the steps of the method;
presence of predetermined availability information, which indicates an availability of predetermined components and/or algorithms and/or communication options;
presence of predetermined quality criteria of the predetermined components and/or algorithms and/or communication options;
presence of a plan, which includes: (i) measures for reducing faults, and/or (ii) measures in response to failures of predetermined components and/or algorithms and/or communication options, and/or (iii) measures for incorrect analyses, and/or (iv) measures in response to incorrect interpretations;
presence of one or more fallback scenarios;
presence of a predetermined function;
presence of a predetermined traffic situation;
presence of predetermined weather;
maximum possible time for a specific performance or execution of at least one of the steps of the method;
presence of a test result, that elements or functions, which are used for executing the method, are presently functioning correctly.

2. The method as recited in claim 1, wherein the data include a driving requirement that the motor vehicle is supposed to follow.

3. The method as recited in claim 2, wherein the driving requirement includes remote control commands for controlling a lateral and/or longitudinal guidance of the motor vehicle remotely.

4. The method as recited in claim 2, further comprising:
processing the surrounding-area signals to detect a collision object situated within a predetermined distance after a tunnel entrance or after a tunnel exit, based on a direction of travel of the motor vehicle;

wherein, in response to the detection of the collision object, the driving requirement includes an emergency braking.

5. The method as recited in claim 4, wherein the collision object is a further vehicle.

6. The method as recited in claim 1, further comprising:
processing the surrounding-area signals to detect a collision object situated within a predetermined distance after a tunnel entrance or after a tunnel exit, based on a direction of travel of the motor vehicle;
wherein, as a function of the detection, the data include information that the collision object has or has not been detected.

7. The method as recited in claim 6, wherein the collision object is a further motor vehicle.

8. A device for assisting a motor vehicle driven in an at least semiautomated manner, for passing through a tunnel, the device configured to:
receive surrounding-area signals that represent an area, which surrounds the motor vehicle and of which at least a part includes the tunnel;
receive safety condition signals, which represent at least one safety condition that must be satisfied, so that the motor vehicle may be assisted from outside of the motor vehicle while passing through the tunnel;
check whether the at least one safety condition is satisfied;
generate data signals, which represent data suitable for assisted traversal of the tunnel by the motor vehicle, based on the surrounding-area signals, and based on a result of whether the at least one safety condition is satisfied; and
output the generated data signals,
wherein the at least one safety condition is, in each instance, an element selected from the following groups of safety conditions:
presence of a predetermined safety integrity level or automotive safety integrity level of at least the motor vehicle and an infrastructure including a communication path and/or communications components, for controlling a motor vehicle remotely;
presence of a maximum latency time of a communication between the motor vehicle and a remote control device for controlling the motor vehicle remotely based on the remote control signals;
presence of a predetermined computer protection level of a device for executing the steps of the method;
presence of predetermined components and/or algorithms and/or communication options, which are used for executing the steps of the method;
presence of redundancy and/or diversity in predetermined components and/or algorithms and/or communication options, which are used for executing the steps of the method;
presence of predetermined availability information, which indicates an availability of predetermined components and/or algorithms and/or communication options;
presence of predetermined quality criteria of the predetermined components and/or algorithms and/or communication options;
presence of a plan, which includes: (i) measures for reducing faults, and/or (ii) measures in response to failures of predetermined components and/or algorithms and/or communication options, and/or (iii) measures for incorrect analyses, and/or (iv) measures in response to incorrect interpretations;
presence of one or more fallback scenarios;
presence of a predetermined function;
presence of a predetermined traffic situation;
presence of predetermined weather;
maximum possible time for a specific performance or execution of at least one of the steps of the method;
presence of a test result, that elements or functions, which are used for executing the method, are presently functioning correctly.

9. A non-transitory machine-readable storage medium on which is stored a computer program for assisting a motor vehicle driven in an at least semiautomated manner, for passing through a tunnel, the computer program, when executed by a computer, causing the computer to perform the following steps:
receiving surrounding-area signals that represent an area, which surrounds the motor vehicle and of which at least a part includes the tunnel;
receiving safety condition signals, which represent at least one safety condition that must be satisfied, so that the motor vehicle may be assisted from outside of the motor vehicle while passing through the tunnel;
checking whether the at least one safety condition is satisfied;
generating data signals, which represent data suitable for assisted traversal of the tunnel by the motor vehicle, based on the surrounding-area signals, and based on a result of whether the at least one safety condition is satisfied; and
outputting the generated data signals,
wherein the at least one safety condition is, in each instance, an element selected from the following groups of safety conditions:
presence of a predetermined safety integrity level or automotive safety integrity level of at least the motor vehicle and an infrastructure including a communication path and/or communications components, for controlling a motor vehicle remotely;
presence of a maximum latency time of a communication between the motor vehicle and a remote control device for controlling the motor vehicle remotely based on the remote control signals;
presence of a predetermined computer protection level of a device for executing the steps of the method;
presence of predetermined components and/or algorithms and/or communication options, which are used for executing the steps of the method;
presence of redundancy and/or diversity in predetermined components and/or algorithms and/or communication options, which are used for executing the steps of the method;
presence of predetermined availability information, which indicates an availability of predetermined components and/or algorithms and/or communication options;
presence of predetermined quality criteria of the predetermined components and/or algorithms and/or communication options;
presence of a plan, which includes: (i) measures for reducing faults, and/or (ii) measures in response to failures of predetermined components and/or algorithms and/or communication options, and/or (iii) measures for incorrect analyses, and/or (iv) measures in response to incorrect interpretations;
presence of one or more fallback scenarios;
presence of a predetermined function;
presence of a predetermined traffic situation;
presence of predetermined weather;

maximum possible time for a specific performance or execution of at least one of the steps of the method;

presence of a test result, that elements or functions, which are used for executing the method, are presently functioning correctly.

\* \* \* \* \*